United States Patent [19]

Roof

[11] Patent Number: 4,527,860

[45] Date of Patent: Jul. 9, 1985

[54] ANTIGLARE REAR VIEW MIRROR

[75] Inventor: James A. Roof, Anderson, Ind.

[73] Assignee: General Motors Corporation, Detroit, Mich.

[21] Appl. No.: 548,925

[22] Filed: Nov. 7, 1983

[51] Int. Cl.³ .............................................. B60R 1/04
[52] U.S. Cl. .................................................... 350/281
[58] Field of Search ........................................ 350/281

[56] References Cited

U.S. PATENT DOCUMENTS

| 3,253,510 | 5/1966 | Clayton | 350/281 |
| 3,508,815 | 4/1970 | Scheitlin et al. | 350/281 |
| 3,525,564 | 8/1970 | Barton | 350/281 |

FOREIGN PATENT DOCUMENTS

| 0137412 | 10/1950 | Australia | 350/281 |
| 0221327 | 5/1959 | Australia | 350/281 |
| 0644424 | 7/1962 | Canada | 350/281 |

Primary Examiner—John K. Corbin
Assistant Examiner—Rebecca D. Gass
Attorney, Agent, or Firm—Edward J. Biskup

[57] ABSTRACT

An antiglare rear view mirror which includes a housing having a prismoidal mirror element provided with a pair of vertically aligned and finger-operated tab members for manually moving the mirror element between two positions so as to present one or the other of the two reflecting surfaces of the mirror element to a viewer.

3 Claims, 4 Drawing Figures

U.S. Patent   Jul. 9, 1985   4,527,860
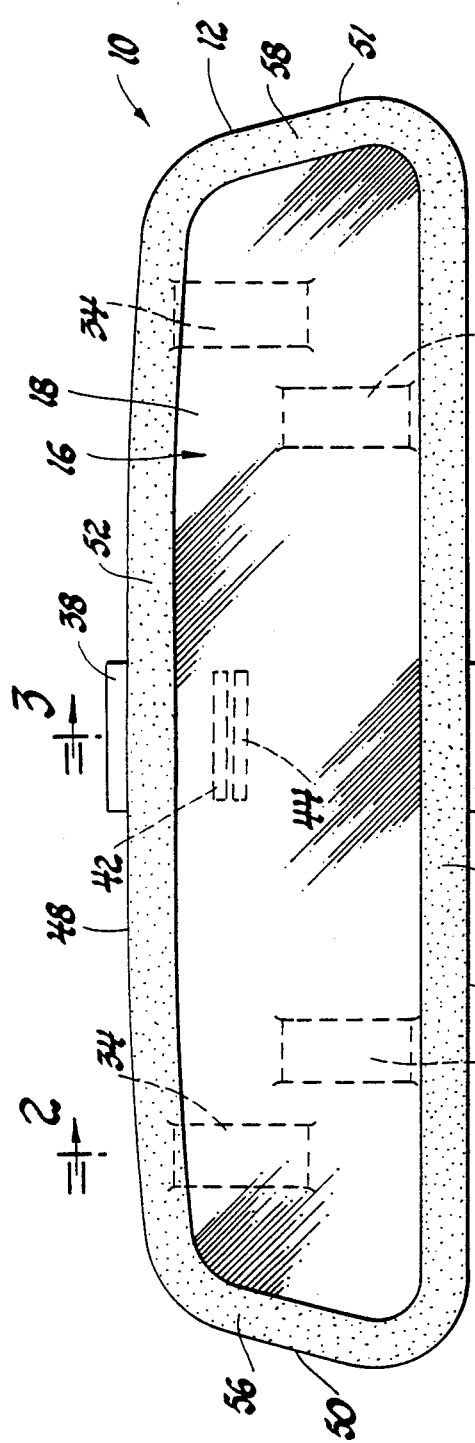
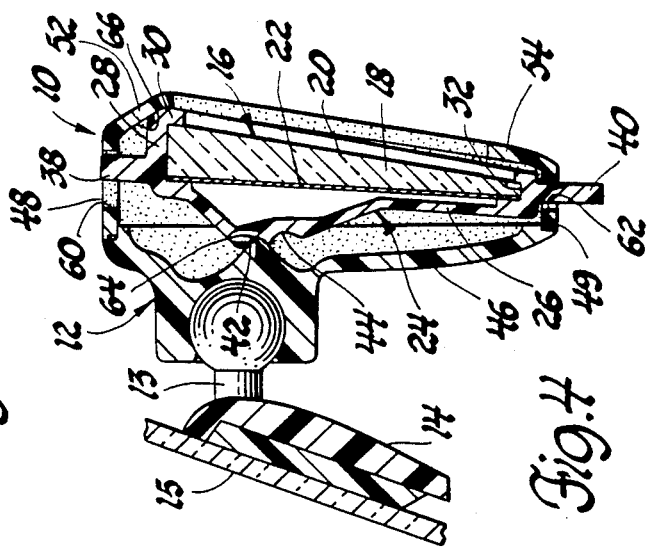
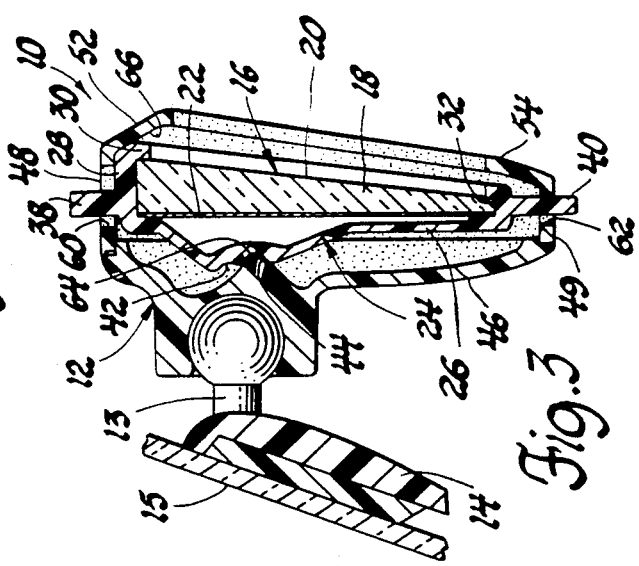
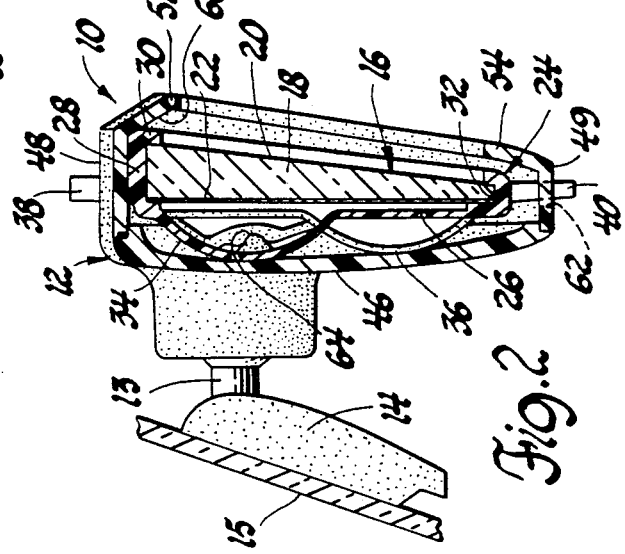

ANTIGLARE REAR VIEW MIRROR

This invention concerns an antiglare rear view mirror of the type which includes a tiltable prismoidal mirror element having two reflecting surfaces of different reflecting powers that are selectively tilted to present one or the other for viewing.

More specifically, the antiglare rear view mirror, according to the present invention, includes a housing having a back wall integrally formed with forwardly extending upper and lower flange members each of which has an aperture therein that is located along a vertical axis. The upper and lower flange members terminate with a rim member and the rim member of the upper flange member is formed with an inclined ramp portion. A prismoidal mirror element having two reflecting surfaces of different reflecting power is located within the housing and is movable vertically between a first position and a second position through a thumb-operated tab member fixed to the lower portion of the mirror element and extending through the aperture formed in the lower flange member, and a finger-operated tab member fixed to the upper portion of the mirror element and extending through the aperture formed in the upper flange member. Cooperating detent means are formed on the back wall of the housing and on the back portion of the mirror element for maintaining the latter in the first position wherein one of the two reflecting surfaces of the mirror element is presented to a viewer and in the second position wherein the other of the two reflecting surfaces is presented to a viewer. In addition, spring means are provided between the back wall and the mirror element that cooperate with the detent means for maintaining the mirror element in the first and second positions and serve to bias the upper portion of the mirror element into engagement with the ramp portion of the upper flange member and bias the finger-operated tab member into engagement with the lower flange member so as to cause the mirror element to pivot about a horizontal axis when the mirror element is moved vertically between the first and second positions.

The objects of the present invention are to provide a new and improved antiglare rear view mirror which includes a housing that has a prismoidal mirror element provided with a pair of opposed finger-operated tab members and supports the mirror element for vertical movement between two positions to present one or the other of the two reflecting surfaces of the mirror element to a viewer; to provide a new and improved antiglare rear view mirror that has a prismoidal mirror element supported for vertical movement relative to a support housing through tab members fixed to the upper and lower portion of the mirror element and extending out of the support housing so as to be accessible for finger operation by the viewer; to provide a new and improved antiglare rear view mirror which has a housing that supports a prismoidal mirror element for pivotal movement about a horizontal axis and includes spring means for biasing the upper portion of the mirror element into engagement with an inclined ramp formed with the upper part of the housing while biasing the lower portion of the mirror element into engagement with a flange member formed with the lower part of the housing; and to provide a new and improved antiglare rear view mirror which has a housing and a vertically movable prismoidal mirror element mounted therein which assumes two predetermined positions provided by cooperating detent means located between the back wall of the housing and the back portion of the mirror element.

Other objects and advantages of the present invention will be apparent upon reading the following detailed description when taken with the accompanying drawings, in which:

FIG. 1 is a front elevational view of an antiglare rear view mirror made in accordance with the present invention;

FIG. 2 is a sectional side view of the antiglare rear view mirror taken on line 2—2 of FIG. 1, and shows the spring members that bias the mirror assembly into engagement with the support housing;

FIG. 3 is a sectional view taken on the line 3—3 of FIG. 1 and shows the manner that the finger-operating tab members are connected to the mirror element and also shows the latter being maintained in the "night" viewing position; and FIG. 4 is a sectional view similar to the view of FIG. 3 but shows the mirror element in the "day" viewing position.

Referring to the drawings, an antiglare rear view mirror 10 is shown which includes a housing 12 connected by a ball stud 13 to a support bracket 14 secured to the inner surface of the windshield 15 of a vehicle. A mirror assembly 16 is located within the housing 12 and the mirror assembly 16 is selectively pivoted between two viewing positions, namely a "day" position which is used under conditions of normal visibility and a "night" position which is used to provide a rearward image of reduced intensity such as is desirable to reduce the headlight glare from a following vehicle.

The mirror assembly 16 includes a conventional prismoidal mirror element 18 that is generally wedge shaped when viewed in transverse cross section. More specifically, the mirror element 18 includes upwardly diverging front and rear reflecting surfaces which are respectively identified by the reference numerals 20 and 22. The rear reflecting surface 22 is provided with a reflective coating formed by any suitable process, such as aluminizing. With this construction, different reflecting powers are provided by the front reflecting surface 20 and the rear reflecting surface 22. Preferably, the front reflecting surface 20 has an approximate 4% reflectivity while the rear reflecting surface 22 has approximately a 90% reflectivity. Therefore, by manually selectively positioning the mirror assembly 16, as will hereinafter be described, the operator of a vehicle can present for viewing the reflecting surface best suited to his immediate driving requirements.

As best seen in FIGS. 2 and 3, the mirror assembly 10 includes the mirror element 18 and a supporting retainer 24 molded as a single piece from a plastic material. The retainer 24 generally comprises a vertically oriented base 26 which includes a forwardly projecting peripheral flange 28 that terminates with an inwardly turned rim 30. The flange 28 and the rim 30 define a forwardly opening cavity 32 which is slightly smaller in peripheral configuration than the mirror element 18. In assembly, the mirror element 18 is snapped or pressed into the cavity 32 and securely held therein by the resiliency of the flange 28 and the rim 30.

As seen in FIGS. 1 and 2, adjacent each end of the base 26, a pair of bowed spring members 34 and 36 are a molded part of the base and project rearwardly and outwardly therefrom, the member 34 being located higher than the member 36. In addition, as seen in FIGS. 1 and 3, the central portion of the base 26 is formed with vertically aligned and outwardly extending tab members 38 and 40 the former of which is integral with the upper portion of the flange 28 and the latter of which is integral with the lower portion of the flange 28. In vertical alignment with the tab members 38 and 40, the base 26 projects rearwardly and defines a pair of elongated notches 42 and 44 which cooperate with the housing 12 to maintain the mirror element 18 in the "day" and "night" positions as will be more fully explained hereinafter.

The housing 12 is also molded from plastic and generally comprises a back wall member 46 which is rigidly connected to forwardly projecting upper and lower flange members 48 and 49 and side flange members 50 and 51. As best seen in FIGS. 1 and 3, the upper and lower flange members 48 and 49 terminate with inwardly turned horizontal rim members 52 and 54, respectively, which extend the length of each of the associated flange members and connect with laterally spaced and substantially vertically oriented rim members 56 and 58 formed with the side flange members 50 and 51 at the opposite ends of the housing 12. Midway between the rim members 56 and 58, the flange members 48 and 50 are provided with elongated apertures 60 and 62 through which the tab members 38 and 40 respectively extend so that they are normally located and accessible exteriorly of the housing 12. In addition, the back wall 46 of the housing 12 adjacent the ball stud 13 is formed with a horizontally extending elongated projection 64 which cooperates with the notches 42 and 44 for maintaining the mirror assembly 16 relative to the housing 12 in a selected position as will now be explained.

In order to facilitate assembly of the components of the antiglare rear view mirror 10, the housing 12 can be made in two pieces, a flange piece consisting of the upper, lower and side flange members 48–51 and the associated rim members 52–58, and a back piece consisting of the back wall member 46. Assuming the housing 12 is made in two pieces as described above, then initially the mirror assembly 16 would be placed into the flange piece with the tab members 38 and 40 positioned within and extending out of the apertures 60 and 62, respectively. The flange piece of the housing 12 would then be secured to the back piece by sonic welding or the like so as to enclose the mirror assembly 16 and position it within the housing 12 as shown in FIGS. 2 and 3. In this position, the projection 64 is located in the notch 44 of the retainer 24 and the spring members 34 and 36 contact the back wall 46 of housing 12 so as to bias the mirror assembly 16 towards the viewer with the result that the upper front portion of the flange 28 contacts an inner inclined surface (ramp) 66 of the rim member 52 and the tab member 40 contacts the frontal edge of the aperture 62. When the mirror assembly 16 is located as shown in FIG. 2, the mirror element 18 is in the aforementioned "night" position to present the front reflecting surface 20 to the viewer. The spring members 34 and 36 which provide the aforementioned biasing force as well as the cooperating detent arrangement provided by the projection 64 and the notch 44 serve to maintain the mirror assembly 16 in the "night" position.

When it is desired to move the antiglare rear view mirror 10 to the "day" viewing position so as to present the rear reflecting surface 22 to the viewer, the tab member 38 is pushed vertically downwardly causing the base 24 of the mirror assembly 16 to flex towards the mirror element 18 to release the projection 64 from engagement with the notch 44 and cause the projection to move into rest within the notch 42 as seen in FIG. 4. At the same time, the inclined surface 66 of the rim member 52 allows the front upper portion of flange 28 to pivot clockwise about a horizontal axis passing through the point of engagement between the tab member 40 and the frontal edge of aperture 62. As a result, the mirror assembly 16 assumes the "day" viewing position of FIG. 4 wherein the rear reflecting surface 22 is then presented for rearward viewing.

It should be apparent that if the viewer wishes to return the mirror assembly 16 to the "night" viewing position, this can be accomplished by pressing vertically upwardly using the thumb on the tab member 40 so as to cause the mirror assembly to again assume the position shown in FIGS. 2 and 3.

Various changes and modifications can be made in this construction without departing from the spirit of the invention. Such changes are contemplated by the inventor and he does not wish to be limited except by the scope of the appended claims.

The embodiments of the invention in which an exclusive property or privilege is claimed are defined as follows:

1. An antiglare rear view mirror for a vehicle comprising a housing having a back wall integrally formed with forwardly extending upper and lower flange members each of which has an aperture therein that is located along a vertical axis, said upper flange member terminating with a rim member formed with an inclined ramp portion, a mirror assembly including a mirror element having two reflecting surfaces of different reflecting power located within said housing for vertical movement between a first position and a second position, a first tab member fixed to the lower portion of said mirror element and a second tab member fixed to the upper portion of said mirror element, said first tab member extending through the aperture formed in said lower flange member and said second tab member extending through the aperture formed in said upper flange member, cooperating detent means formed on said housing and on said mirror assembly for locating said mirror element in said first position wherein one of said two reflecting surfaces is presented to a viewer and in said second position wherein the other of said two reflecting surfaces is presented to a viewer, and spring means between said housing and said mirror assembly cooperating with said detent means for maintaining said mirror assembly in said first and second positions and serving to bias said upper portion of said mirror assembly into engagement with said ramp portion of said upper flange member and bias said first tab member into engagement with said lower flange member so as to cause said mirror assembly to pivot about a horizontal axis when said mirror assembly is moved vertically between said first and second positions.

2. An antiglare rear view mirror for a vehicle comprising a housing having a back wall integrally formed with forwardly extending upper and lower flange members each of which has an aperture therein that is located along a vertical axis, said upper flange member terminating with a rim member formed with an inclined ramp portion, a mirror assembly including a mirror element having two reflecting surfaces of different reflecting power located within said housing for vertical movement between a first position and a second position, a first tab member fixed to the lower portion of said mirror element and a second tab member fixed to the upper portion of said mirror element, said first tab member extending through the aperture formed in said lower flange member and said second tab member extending through the aperture formed in said upper flange member, cooperating detent means formed on said back wall of said housing and on said mirror assembly for locating said mirror element in said first position wherein one of said two reflecting surfaces is presented to a viewer and in said second position wherein the other of said two reflecting surfaces is presented to a viewer, and spring means carried by said mirror assembly and contacting said back wall for biasing said upper portion of said mirror assembly into engagement with said ramp portion of said upper flange member and for biasing said first tab member into engagement with said lower flange member so as to cause said mirror assembly to pivot about a horizontal axis when said mirror assembly is moved vertically between said first and second positions so that one or the other of said reflecting surfaces is presented to the viewer, said spring means cooperating with said detent means for maintaining said mirror assembly in said first and second positions.

3. An antiglare rear view mirror for a vehicle comprising a housing having a back wall integrally formed with forwardly extending upper and lower flange members each of which has an aperture therein that is located along a vertical axis midway between the side portions of said housing, said upper flange member terminating with a depending rim member formed with an inclined ramp portion, a mirror assembly including a mirror element having two reflecting surfaces of different reflecting power located within said housing for vertical movement between a first position and a second position, a thumb-operated tab member fixed to the lower portion of said mirror element and a finger-operated tab member fixed to the upper portion of said mirror element, said thumb-operated tab member extending through the aperture formed in said lower flange member and said finger-operated tab member extending through the aperture formed in said upper flange member, cooperating detent means formed on said back wall of said housing and on said mirror assembly for locating said mirror element in said first position wherein one of said two reflecting surfaces is presented to a viewer and in said second position wherein the other of said two reflecting surfaces is presented to a viewer, and spring means adjacent the side portions of said housing and between said back wall and said mirror assembly cooperating with said detent means for maintaining said mirror assembly in said first and second positions and serving to bias said upper portion of said mirror element into engagement with said ramp portion of said upper flange member and bias said thumb-operated tab member into engagement with said lower flange member so as to cause said mirror assembly to pivot about a horizontal axis when said mirror assembly is moved vertically between said first and second positions.

* * * * *